United States Patent [19]

Minami et al.

[11] 4,244,974
[45] Jan. 13, 1981

[54] MULTI-LAYER ALIMENTARY PASTE

[75] Inventors: Junichi Minami, Tondabayashi; Minoru Shigeto; Sadaaki Ishibashi, both of Shiga, all of Japan

[73] Assignee: Nissin Shokuhin Kaisha, Limited, Osaka, Japan

[21] Appl. No.: 973,703

[22] Filed: Dec. 27, 1978

[30] Foreign Application Priority Data

Dec. 27, 1977 [JP] Japan .................... 52-160627
Dec. 27, 1977 [JP] Japan .................... 52-160628

[51] Int. Cl.³ .................... A21D 2/08; A21D 2/26; A21D 2/18
[52] U.S. Cl. .................... 426/94; 426/272; 426/275; 426/557; 426/502; 426/451
[58] Field of Search ............. 426/557, 94, 502, 517, 426/560, 272, 275, 89, 144, 451, 516, 514, 515

[56] References Cited

U.S. PATENT DOCUMENTS

| | | | |
|---|---|---|---|
| 1,349,524 | 8/1920 | Miner | 426/557 X |
| 1,434,498 | 11/1922 | Miner | 426/557 |
| 2,615,809 | 10/1952 | Jean | 426/272 X |
| 3,663,232 | 5/1972 | Glabe | 426/557 |
| 3,762,931 | 10/1973 | Craig et al. | 426/557 |
| 3,798,343 | 3/1974 | Vitale | 426/502 |
| 3,968,258 | 7/1976 | Akin et al. | 426/557 |
| 4,000,330 | 12/1976 | Siros | 426/557 |
| 4,120,989 | 10/1978 | Grindstaff | 426/451 X |

FOREIGN PATENT DOCUMENTS

| | | | |
|---|---|---|---|
| 275472 | 6/1952 | Japan . | |
| 48-7342 | 3/1973 | Japan | 426/557 |
| 50-11973 | 5/1975 | Japan | 426/557 |
| 50-11974 | 5/1975 | Japan | 426/557 |
| 50-15013 | 5/1975 | Japan . | |
| 51-7145 | 1/1976 | Japan | 426/557 |
| 51-29259 | 3/1976 | Japan | 426/557 |
| 51-16504 | 5/1976 | Japan | 426/502 |
| 51-17263 | 5/1976 | Japan . | |
| 53-24497 | 7/1978 | Japan . | |

*Primary Examiner*—Steven L. Weinstein
*Attorney, Agent, or Firm*—Armstrong, Nikaido, Marmelstein & Kubovcik

[57] ABSTRACT

An alimentary paste having improved texture and production and reconstitution properties. The paste is a wheat flour paste which is in the form of a multi-layer paste, or laminate, of a pair of outer layers having sandwiched therebetween, preferably, a single inner layer. The pastes of the respective layers are prepared such that the ratio of the amount of starch to the amount of protein of each of the outer layers is substantially greater than that of the inner layer.

12 Claims, 3 Drawing Figures

MULTI-LAYER ALIMENTARY PASTE

BACKGROUND OF THE INVENTION

1. Field of the Invention

The present invention relates to alimentary pastes and, more particularly, to pre-cooked or instant-cooking oriental-type long noodles having multiple layers, or plies, that differ from one another with respect to the amount of protein and/or starch contained therein.

2. Description of the Prior Art

Improvements have conventionally been made in the quality of Japanese-type noodles (called "Udon" in Japan) and of buckwheat noodles, etc., by improving the manufacturing processes, developing additives for improving the noodle quality or by attempting to mix animal protein therewith. However, all such improvements relate substantially to noodles of a single layer and involved the following problems, A–E, inherent with such noodles:

(A) Improving the properties of materials to be made into noodles and improving the reconstitution properties of the product noodles generally oppose each other. For example, addition of too much protein causes the dough sheets to be hard and readily broken or cut and prevents the noodle product from being smooth or slippery textured;

(B) Effects of additives to the noodles to prevent them from excessively swelling with water are limited;

(C) Additives are included in, and affect, the whole of the noodles when they should be effective only on the surfaces and, thus, a portion of the additives is extra and uneconomical and adversely affects the taste and texture of the noodle;

(D) Animal or vegetable protein added to the noodles may harden them, reduce the surface smoothness or cause a peculiar protein smell which is inherently bad and adversely affects the consumer's appetite; and (E) Noodles containing protein therein will, when fried, be colored brown, thereby reducing their commercial value.

Attempts have also been made to produce Japanese-type noodles having a plurality of layers as exemplified by the prior Japanese utility model publications described below.

Japanese No. 27-5472 shows a noodle having a longitudinal bore in which egg liquid is enclosed to provide a particular taste and nourishment and, when the egg liquid is hardened as the noodle is boiled, to prevent the noodle from being broken. This is, however, no improvement of the texture of the noodles in view of the foregoing problems, A–E, and the noodles are not suitable for mass production.

Japanese No. 50-15013 shows a noodle having an inner layer consisting essentially of buckwheat flour with a small amount of wheat flour and a proper amount of powdered bonito and outer layers consisting essentially of wheat flour with a small amount of powdered bonito to prevent the inner layers, when boiled, from being broken and to flavor the noodle with bonito. Again, there is no improvement with respect to the foregoing problems, A–E.

Japanese No. 51-17263 shows a noodle having a pair of layers, one being a buckwheat paste strip and the other being a wheat paste strip called "Udon". Such a noodle includes the taste of both buckwheat and "Udon" while the wheat paste strip reinforces the buckwheat noodle portion. However, there is no improvement with respect to said problems, A–E.

It is an object of this invention, therefore, to provide novel, multi-layer noodles which can be economically mass-produced without breaking or cutting and which can be used for raw, steamed, boiled, dried or pre-cooked noodles.

Another object of this invention is to provide multi-layer noodles which can be quickly restored or reconstituted with hot water or as boiled upon consumption, the outer layers having a relatively smoother or more slippery texture and the inner layer or layers having a relatively more elastic or rubbery texture, both textures being significant to Japanese or oriental noodles.

A further object of the invention is to provide multi-layer noodles, the outer layers of which, being generally rich in starch and poor in protein, will in production prevent the dough sheet from being broken and will shut in the smell of protein in the inner layers, which is generally rich in protein, while the inner layer, being generally poor in starch, will minimize the undesirable excessive swelling of the noodle in hot water upon consumption.

SUMMARY OF THE INVENTION

The foregoing and other objects are achieved, according to this invention, by the provision of an alimentary paste or noodle comprising, as the basic component thereof, wheat flour and having a plurality of layers; preferably, an inner layer and a pair of outer layers sandwiching the inner layer. The ratio of the amounts of protein to starch contained in the inner layer or layers being substantially greater than that of the outer layers. Mathematically, this is expressed as:

$$\frac{\text{amount of protein}}{\text{amount of starch}} \text{ (inner layer)} > \frac{\text{amount of protein}}{\text{amount of starch}} \text{ (outer layer)}$$

BRIEF DESCRIPTION OF THE DRAWINGS

Preferred, but not restrictive, embodiments of this invention will be described hereinafter with reference to the accompanying drawings in which.

DETAILED DESCRIPTION OF THE INVENTION

The alimentary pastes or noodles according to the present invention having the specified ratios of protein and starch can be prepared by the following six methods. In methods (1)–(5) below, it is assumed that both inner and outer layers comprise wheat flour containing the same weight percentages of protein and starch; for example, flour of the same grade or (flour) strength. Methods:

(1) Only the inner layer is enriched with protein. The outer layers are unchanged;

(2) The inner layer is enriched with protein and the outer layers with starch;

(3) The inner layer is enriched with protein more than the outer layers are;

(4) Only the outer layers are enriched with starch. The inner layer is unchanged;

(5) The outer layers are enriched with starch more than the inner layer is; and (6) The inner layer comprises as material wheat flour originally containing richer protein, while the outer layers comprise as material wheat flour originally containing poorer protein.

Figure 3:
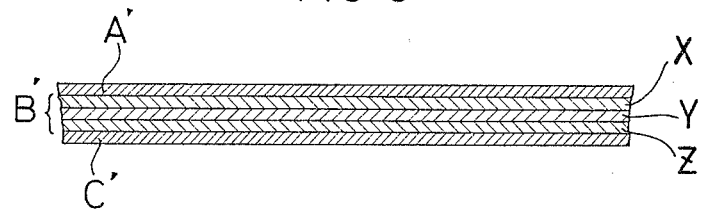
FIG. 3 shows a five-layer paste in longitudinal section.

It is to be noted here that the terminology "inner layer" as employed herein is intended to include a single layer or a plurality of inner layers as exemplified by the embodiment according to the invention illustrated in FIG. 3.

The kinds of raw materials to be employed in the present invention may be as described below.

The flour used as the principal material of the pastes may have an appropriate flour strength, such as strong, semi-strong, medium or weak flour depending on each embodiment.

The starch that is added to the flour according to the invention may be any one or a mixture of starches including cereal starch such as flour starch, rice powder, rice starch and corn starch, etc.; potato starch; sweet potato starch, tapioca, etc. In terms of achieving a smooth texture, potato starch is most preferable empirically.

The protein that is added to the flour may be any one or a mixture of proteins, including vegetable protein, such as protein obtained from seed for oil extraction, powdered soybean or soya bean protein, cottonseed, peanut and sesame and the like; cereal flour protein (gluten), yeast protein (powdered yeast extract), algae protein (chlorella powder, spirulina powder); and animal protein such as that from eggs, milk protein (casein), sea products (powdered pollack, etc.), meats and the like.

Further additives to the flour which may be used selectively in the various layers include the usual additives, such as sodium chloride, "Kansui" (a kind of natural water available in China and containing one or more of the components: potassium carbonate, sodium bicarbonate, potassium phosphates and sodium phosphates), lecithins, glycerine fatty acid ester, suger ester or emulsified oil as an emulsifier for improving slipperiness or smoothness of the paste and reconstitution in hot water. Wheat germ may be mixed within the inner layer.

Referring to the drawings, the alimentary pastes according to this invention are prepared by, firstly, mixing predetermined amounts of flour and other materials (as indicated in the working examples) by mixers 1a–1c, mixers 1a and 1c being used for the outer layers and mixer 1b for the inner layer. In the mixers, the mixtures are kneaded in a conventional manner to form individual doughs.

Each dough is passed between a pair of rolls 2a, 2b, 2c to form a dough sheet, or band, A, B and C, each of which is about 0.8–8 millimeters thick (as measured after having slightly expanded following about ten or more seconds after being released from between the rolls). The three sheets are brought together and passed between another pair of rolls 3 and between further pairs of rolls (not shown) with sheet B interposed between sheets A and C to finally form a three-layer paste D (also shown in FIG. 2) which is about 0.5–4 mm thick (as measured after having slightly expanded following about ten seconds or more after being released from the last pair of rolls (not shown). Rolled paste D is cut into strips or strings (not shown) of a suitable width of from about 1 to 4 mm and of a proper length for human consumption.

The ratio of thickness of the inner layer to that of each of the outer layers may be in the range of 1:10–10:1 and, preferably, is in the range of 1:4–2:1 in view of producibility, texture and costs.

The strips may, depending on the uses, be immediately packed for market, or boiled or steamed at 80°–100° C. for 1–3 minutes, fried at 130°–160° C. for 1–3 minutes or dried in air at 60°–90° C. for 30–50 minutes, all in a conventional manner.

Figure 1:
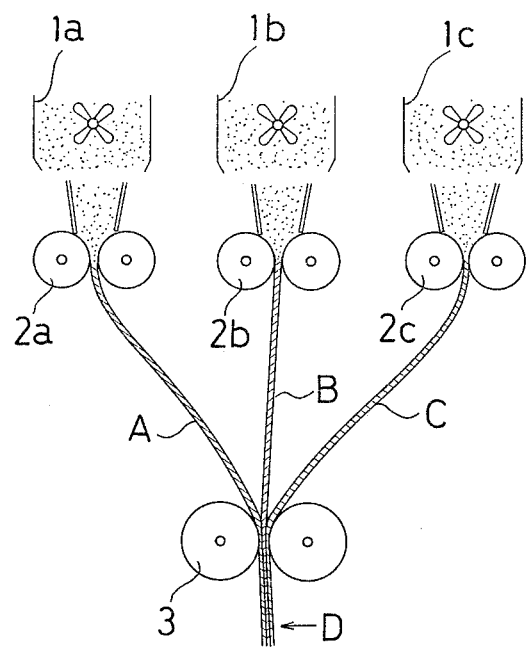
FIG. 1 schematically illustrates a process of making a three-layer paste.
Figure 2:
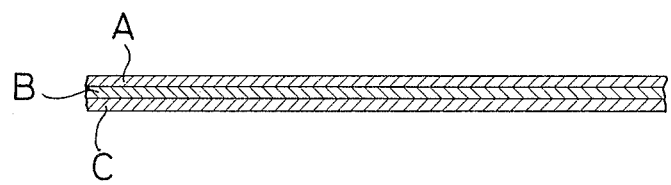
FIG. 2 is an enlarged view of the three-layer paste in longitudinal section.

Inner layer B is preferably a single ply as shown in FIG. 2, or may consist of three plies B', as shown in FIG. 3, where an inner ply Y has the same composition as outer layers A' and C', while outer plies X and Z of the inner "layer" B' have the same composition as inner layer B of FIG. 2.

Working examples of this invention are as follows:

EXAMPLE 1

This example illustrates Method (1) described above.
The material of the inner layer was a mixture of:
700 grams of semi-strong wheat flour;
300 grams of soybean protein powder;
15 grams of sodium chloride; and
320 grams of water.
The material of the outer layers was a mixture of:
1,000 grams of semi-strong wheat flour;
15 grams of sodium chloride; and
310 grams of water.

Each mixture was kneaded and rolled into a dough sheet. The ratio of thickness of the inner layer to that of each outer layer sheet was 2:1. The sheets were then rolled with the inner layer sheet interposed between the outer layer sheets to form a 0.8 mm thick sheet of paste, which was then cut into 1.5 mm wide strips. The strips were steamed at 100° C. for 2 minutes and fried in 150° C. lard for 3 minutes. For purposes of consumption, the resultant three-layer strips were put in 95° C. water for 3 minutes and became smooth, slippery and elastically/rubbery textured.

EXAMPLE 2

This example illustrates Method (2).
The material of the inner layer was a mixture of:
750 grams of strong wheat flour (high strength);
150 grams of soybean protein;
50 grams of vital gluten powder;
50 grams of casein;
15 grams of sodium chloride;
5 grams of Kansui water; and
380 grams of water.
The material of the outer layers was a mixture of:
800 grams of semi-strong wheat flour;
200 grams of starch;
15 grams of sodium chloride;
3 grams of Kansui water; and
320 grams of water.

Each mixture was kneaded and rolled into a dough sheet. The ratio of thickness of the inner layer sheet to that of each outer layer sheet was 4:1. The sheets were then rolled, with the inner layer sheet interposed between the outer layer sheets to form a 1.2 mm thick paste, which was then cut into 1.7 mm wide strips. The strips were steamed at 100° C. for 2 minutes and dried in 85° C. air for 40 minutes. For purposes of consumption, the resultant strips were boiled for 4 minutes and obtained a texture similar to that of Example 1.

EXAMPLE 3

This example illustrates Method (3).
The material of the inner layer was a mixture of:
750 grams of semi-strong wheat flour;
100 grams of soybean protein;
100 grams of casein;
50 grams of vital gluten powder;
20 grams of sodium chloride;
5 grams of Kansui water; and
370 grams of water.
The material of the outer layers was a mixture of:
1,000 grams of medium wheat flour;
30 grams of egg white;
20 grams of sodium chloride;
2 grams of Kansui water; and
320 grams of water.
Each mixture was kneaded and rolled into a dough sheet. The ratio of thickness of the inner layer sheet to that of each outer layer sheet was 1:1. The sheets were then rolled with the inner layer sheet interposed between the outer layer sheets to form a 1.3 mm thick paste, which was then cut into 1.5 mm wide strips. The strips were steamed at 90°-100° C. for 1 minute. For purposes of consumption, the resultant Chinese noodle type strips were boiled for 5 minutes and became fixedly textured while the boiling water became a little muddied.

EXAMPLE 4

This example illustrates Method (4).
The material of the inner layer is a mixture of:
1,000 grams of semi-strong wheat flour;
20 grams of sodium chloride;
3 grams of Kansui water; and
320 grams of water.
The material of the outer layers is a mixture of:
800 grams of semi-strong wheat flour;
200 grams of starch;
20 grams of sodium chloride;
4 grams of lecithin;
2 grams of Kansui water; and
330 grams of water.
Each mixture was kneaded and rolled into a dough sheet. The ratio of thickness of the inner layer sheet to that of each outer layer was 2:1. The sheets were then rolled with the inner layer sheet interposed between the outer layer sheets to form a 1.1 mm thick paste, which was then cut into 1.5 mm wide strips. The strips were steamed at 100° C. for 1.5 minutes and fried in palm oil of 135° C. for 1.5 minutes. For purposes of consumption, the fired strips were boiled for 3 minutes and became smooth and elastically textured.

EXAMPLE 5

This example illustrates Method (5).
The material of the inner layer is a mixture of:
600 grams of semi-strong wheat flour;
200 grams of semolina;
200 grams of potato flour starch;
20 grams of sodium chloride;
1 gram of disodium phosphate;
30 grams of rice oil; and
320 grams of water.
The material of the outer layers is a mixture of:
300 grams of semi-strong wheat flour;
200 grams of semolina;
500 grams of potato flour starch;
20 grams of sodium chloride;
1 gram of disodium phosphate;
30 grams of rice oil; and
340 grams of water.
Each mixture was kneaded and rolled into a dough sheet. The ratio of thickness of the inner layer sheet to that of each outer layer was 1:1. The sheets were then rolled with the inner layer sheet interposed between the outer layers sheets to form a 2 mm thick paste, which was cut into 2 mm wide strips. The strips were boiled for 4 minutes and cooled. For purposes of consumption, the strips were boiled for 2 minutes and became spaghetti-like textured.

EXAMPLE 6

This example illustrates Method (6).
The material of the inner layer was a mixture of:
1,000 grams of strong wheat flour;
15 grams of sodium chloride; and
350 grams of water.
The material of the outer layers was a mixture of:
1,000 grams of weak wheat flour;
15 grams of sodium chloride; and
350 grams of water.
Each mixture was kneaded and rolled into a dough sheet. The ratio of thickness of the inner layer sheet to that of each outer layer sheet was 2:1. The sheets were then rolled with the inner layer sheet interposed between the outer layer sheets to form a 2 mm thick paste, which was then cut into 2.5 mm wide strips. For purposes of consumption, the Japanese noodle type strips were boiled for 10-15 minutes and became elastically textured and relatively transparent looking.

EXAMPLE 7

This example also follows Method (1) for purposes of experimental comparison with a conventional single-layer noodle prepared by the addition to the flour of different amounts of protein.
The material of the single-layer noodle and of the inner layer of the three-layer noodle was a mixture of:
1 kilogram (total) of semi-strong wheat flour and vital gluten powder;
16 grams of sodium chloride;
2 grams of Kansui water; and
320 grams of water.
The material of the outer layers of the three-layer noodle was a mixture of:
1 kilogram of semi-strong wheat flour;
15 grams of sodium chloride;
2 grams of Kansui water; and
310 grams of water.
The mixture for the single-layer noodle was kneaded and rolled into a 1.2 mm thick dough sheet. The mixtures for the three-layer noodle were kneaded and rolled in the same manner as Example 1 to form a 1.2 mm thick dough sheet. Each sheet was cut into 1.5 mm wide strips and steamed at 97°-100° C. for 1 minute and fried in 135° C. palm oil for 1.5 minutes. To prepare the noodles for consumption, the strips were boiled for 3 minutes and gave the results shown in Tables 1 and 2 below.

EXAMPLE 8

This example also follows Method (4) for purposes of experimental comparison with a conventional single-layer noodle prepared by the addition to the flour of 5 different amounts of starch. The material of the single-layer noodle and the outer layers of the three-layer noodle was each a mixture of:

- 1 kilogram (total) of semi-strong wheat flour and potato starch;
- 20 grams of sodium chloride;
- 3 grams of Kansui water; and
- 350 grams of water.

The material of the inner layer of the three-layer noodle was a mixture of:

- 1 kilogram of semi-strong wheat flour;
- 20 grams of sodium chloride;
- 3 grams of Kansui water; and
- 350 grams of water.

The mixture for the single-layer noodle was kneaded and rolled into a 0.95 mm thick dough sheet. The mixtures for the three-layer noodle were kneaded and rolled in the same manner as in Example 4 to form a 0.95 mm thick dough sheet. Each sheet was cut into 1.7 mm wide strips and steamed at 97°–100° C. for 2 minutes and dried in 85° C. air for 40 minutes. To prepare the noodles for consumption, the strips were put in 95° C. hot water for 4 minutes to give the results shown in Tables 3 and 4 below:

TABLE 1

Applicant's three-layer noodle (Method (1))
Amount in wt. % of vital gluten powder added to inner layer (1)

|  | 5 | 10 | 20 | 40 | 60 | 80 |
|---|---|---|---|---|---|---|
| Producibility (2) | well | well | well | well | well | somewhat bad |
| Smoothness (4) | high | high | high | high | somewhat low | somewhat low |
| Expansion with Hot Water (3) | somewhat high | low | low | low | low | low |
| Restorability (4) | high | high | high | high | somewhat low | somewhat low |
| Elasticity (4) | somewhat low | high | high | high | high | somewhat low |
| Smell or Odor (4) | good | good | good | good | good | somewhat bad |

TABLE 2

One-Layer noodle
Amount in wt. % of vital gluten powder added to noodle

|  | 5 | 10 | 20 | 40 | 60 | 80 |
|---|---|---|---|---|---|---|
| Producibility | well | well | somewhat bad | bad | bad | bad |
| Smoothness | high | somewhat bad | low | low | low | low |
| Expansion with Hot Water | low | low | low | low | low | low |
| Restorability | high | somewhat low | low | low | low | low |
| Elasticity | somewhat low | high | high | somewhat low | low | low |
| Smell or Odor | somewhat bad | bad | bad | bad | bad | bad |

TABLE 3

Applicants' three-layer noodle
Amount in wt. % of starch added to outer layer

|  | 5 | 20 | 40 | 60 | 90 |
|---|---|---|---|---|---|
| Producibility | well | well | well | well | somewhat well |
| Smoothness | somewhat low | somewhat low | high | very high | very high |
| Expansion with Hot water | somewhat great | little | little | little | little |
| Restorability | low | high | high | high | high |
| Elasticity | somewhat low | somewhat low | high | very high | very high |

TABLE 4

One-layer noodle
Amount in wt. % of starch added to noodle

|  | 5 | 20 | 40 | 60 | 90 |
|---|---|---|---|---|---|
| Producibility | well | well | somewhat well | not producible when noodles are thinner than 1.5mm | not producible |
| Smoothness | low | somewhat low | high |  |  |
| Expansion with Hot Water | great | great | little |  |  |
| Restorability | low | low | high |  |  |
| Elasticity | low | somewhat low | high |  |  |

NOTES:
(1) The percentage by weight of the amount of vital glutan powder or starch is based on the total amount of the flour and the gluten powder or starch added thereto;
(2) "Producibility" means how well the noodle can be produced without breaks or cuts during rolling or cutting into strips;
(3) "Expansion with hot water" was observed 10 minutes after the noodles were restored with the hot water; and
(4) "Smoothness", "Restorability", "Elasticity" and "Smell or Odor" were observed immediately after the noodles were restored with the hot water or by boiling as the case may be.

As is apparent from Table 1, the amount of vital glutan powder added to the inner layer may be within the range of 5–80 wt. % (based on the weight of the flour and protein) and should preferably be 10–50 wt. %. An amount of the vital gluten powder of less than 5 wt. % will have no substantial effect, while an amount of more than 80 wt. % produces all undesirable results with respect to all of the aspects of Table 1 except "expansion with hot water."

As is apparent from Table 3, the amount of the starch added to the outer layers should be within the range of 5–90 wt. % (based on the weight of flour and starch)

and preferably 20–60 wt. %. An amount of the starch of less than 5 wt. % will have no substantial effects while an amount of more than 90 wt. % will cause breaks in the noodles.

Although the invention has been described with respect to certain preferred embodiments thereof, it is not intended to be limited thereto but, instead, includes all those embodiments within the scope and spirit of the appended claims.

What is claimed:

1. An alimentary paste product comprising, as the basic component thereof, wheat flour, and being in the form of a laminate of a plurality of layers including a pair of outer layers and at least one inner layer sandwiched therebetween, each layer of the laminate being formed from an alimentary paste and wherein the ratio of the amount of starch contained in each of said outer layers to the amount of protein contained in each of said outer layers is greater than that of an inner layer.

2. An alimentary paste product according to claim 1 having a single inner layer sandwiched between a pair of outer layers.

3. An alimentary paste product according to claim 2 wherein the inner layer is enriched with protein relative to the outer layers.

4. An alimentary paste product according to claim 2 wherein the inner layer is enriched with protein and the outer layers are enriched with starch relative to the other layers.

5. An alimentary paste product according to claim 2 wherein the outer layers are enriched with starch relative to the inner layer.

6. An alimentary paste product according to claim 2 wherein the inner layer consists essentially of wheat flour originally rich in protein while the outer layers consist essentially of wheat flour originally rich in starch.

7. An alimentary paste product according to any one of claims 2–6 wherein the ratio of thickness of each outer layer to that of the inner layer is in the range of 1:10 to 10:1.

8. An alimentary paste product according to claim 7 wherein the ratio of thickness of each outer layer to that of the inner layer is in the range of 1:4 to 2:1.

9. An alimentary paste product according to claim 7 wherein each outer layer contains from 5–90 wt. % of starch based on the amount of wheat flour and starch and wherein the inner layer contains from 5–80 wt. % of protein based on the amount of wheat flour and protein.

10. An alimentary paste product according to claim 9 wherein each outer layer contains from 20–60 wt. % of starch based on the amount of wheat flour and starch and wherein the inner layer contains from 10–50 wt. % of protein based on the amount of wheat flour and protein.

11. An alimentary paste product according to claim 9 wherein the inner layer contains wheat germ.

12. An alimentary paste product according to claim 7 wherein the inner layer contains wheat germ.

* * * * *

UNITED STATES PATENT AND TRADEMARK OFFICE
CERTIFICATE OF CORRECTION

PATENT NO. : 4,244,974
DATED : January 13, 1981
INVENTOR(S) : MINAMI ET AL

It is certified that error appears in the above-identified patent and that said Letters Patent are hereby corrected as shown below:

On the title page of the patent, item [73], the name of the Assignee should read --Nissin Shokuhin Kabushiki Kaisha--.

Column 4, line 8: "1:4-2:1" should read --4:1-1:2--.

Signed and Sealed this

Nineteenth Day of October 1982

[SEAL]

Attest:

Attesting Officer

GERALD J. MOSSINGHOFF
Commissioner of Patents and Trademarks